United States Patent
Balasubramanian et al.

(10) Patent No.: US 10,976,973 B2
(45) Date of Patent: Apr. 13, 2021

(54) APPARATUS AND METHOD FOR SHARING A PRINTABLE ELECTRONIC DOCUMENT BETWEEN USERS

(71) Applicant: XEROX CORPORATION, Norwalk, CT (US)

(72) Inventors: Jeyalakshmi Balasubramanian, Chennai (IN); Sainarayanan Gopalakrishnan, Chennai (IN); Mohideen Abubucker Farook, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/439,137

(22) Filed: Jun. 12, 2019

(65) Prior Publication Data
US 2020/0394004 A1   Dec. 17, 2020

(51) Int. Cl.
  G06F 3/12   (2006.01)
  H04N 1/21   (2006.01)
  H04N 1/00   (2006.01)

(52) U.S. Cl.
  CPC .......... *G06F 3/1237* (2013.01); *G06F 3/1286* (2013.01); *H04N 1/00238* (2013.01); *H04N 1/00244* (2013.01); *H04N 1/00477* (2013.01); *H04N 1/2183* (2013.01); *H04N 1/2187* (2013.01)

(58) Field of Classification Search
  CPC .... G06F 3/1237; G06F 3/1286; G06F 3/1296; H04N 1/00477; H04N 1/0035; H04N 1/00952; H04N 1/2179; H04N 1/2183; H04N 1/32545

USPC ........ 358/1.11–1.18, 400–404; 709/201–203
See application file for complete search history.

(56) References Cited

U.S. PATENT DOCUMENTS

| | | | | |
|---|---|---|---|---|
| 9,807,073 | B1* | 10/2017 | Miller | H04L 63/08 |
| 2004/0172586 | A1* | 9/2004 | Ragnet | G06F 16/93 |
| | | | | 715/255 |
| 2006/0282466 | A1* | 12/2006 | Yasukaga | G06F 21/6218 |
| 2009/0284785 | A1* | 11/2009 | Bando | G06F 3/1288 |
| | | | | 358/1.15 |
| 2011/0317215 | A1* | 12/2011 | Ida | H04N 1/00233 |
| | | | | 358/1.15 |
| 2013/0222827 | A1* | 8/2013 | Watanabe | G06F 3/122 |
| | | | | 358/1.13 |
| 2017/0013168 | A1* | 1/2017 | Kosaka | H04N 1/00244 |

* cited by examiner

*Primary Examiner* — Chad Dickerson
(74) *Attorney, Agent, or Firm* — Jones Robb, PLLC

(57) ABSTRACT

Systems, methods, and devices are configured to share a printable electronic document created as part of a job, such as a print, copy, or scan job, between users. They include receiving a command to print an electronic document associated with a job initiated on a multi-function device, the job initiated in response to an input from a first user. They further include receiving an input to share the electronic document associated with the job with a second user and identifying the second user. They also include sending a notification message to the identified second user, the notification message indicating an availability of the electronic document associated with the job to the identified second user.

20 Claims, 8 Drawing Sheets

APPARATUS AND METHOD FOR SHARING A PRINTABLE ELECTRONIC DOCUMENT BETWEEN USERS

TECHNICAL BACKGROUND

Networked printer systems allow a user to create and submit a processing job, such as a print job, a copy job, or scan job for physical or electronic document to a multi-function printer or multi-function device (MFD). Networked printer systems may also allow the user to print an electronic document from a job created as a print job, copy job, or scan job on one MFD or printer and print the electronic document on any other printer or MFD on the network. However if the user wishes to share the electronic document used or created as part of the job (e.g., print job, copy job, or scan job) with any other users, the user typically has to transfer the electronic document to another device, copy the electronic document to a portable memory device, send an email message to the other user with the electronic document as an attachment, or share his/her login credentials with the other user.

The available mechanisms for sharing a printable electronic document between users, created as part of a job initiated at an MFD have some drawbacks. Sharing authentication or logon information between users or with persons not authorized to have access to the network may create security issues and may further be against business policy. Additionally, sharing the source file with another user, using a mechanism such as through email, server sharing, direct copy, or any other method of file transfer, requires an additional use of resources and additional time from the users for accessing and transferring the file, creating the print job, finally printing the document. Further, sharing a printable electronic document created from a physical document as part of a copy or scan job at an MFD requires additional time and resources by the first user to transfer the printable electronic document using a device other than the MFD. Therefore, there is a need to address the issues associated with sharing a printable electronic document created or used as part of a job at an MFD between users.

OVERVIEW

Exemplary embodiments described herein include methods, systems, and apparatuses for releasing a secure print job between users. An exemplary system includes a print processor that receives a command to print an electronic document associated with a job initiated on an MFD, the job initiated in response to an input from a first user. The system also includes a user interface that receives an input to share the electronic document associated with the job with a second user, the second user identified based on input from the first user. The system further includes a network interface that provides a notification message to the second user, the notification message indicating an availability of the electronic document associated with the job to the second user.

An exemplary method includes receiving a command to print an electronic document associated with a job initiated on an MFD, the job initiated in response to an input from a first user. The method further includes receiving an input to share the electronic document associated with the job with a second user and identifying the second user. The method also includes sending a notification message to the identified second user, the notification message indicating an availability of the electronic document associated with the job to the identified second user.

An exemplary apparatus includes a memory for storing information associated with an electronic document created as part of one of a print job, a copy job, or scan job initiated by a primary user. The apparatus further includes a processor configured to receive an input to share the electronic document with an alternate user, identify the alternate user, and provide instructions to send an electronic message to the identified alternate user, the electronic message indicating an availability for access to the electronic document by the identified alternate user.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
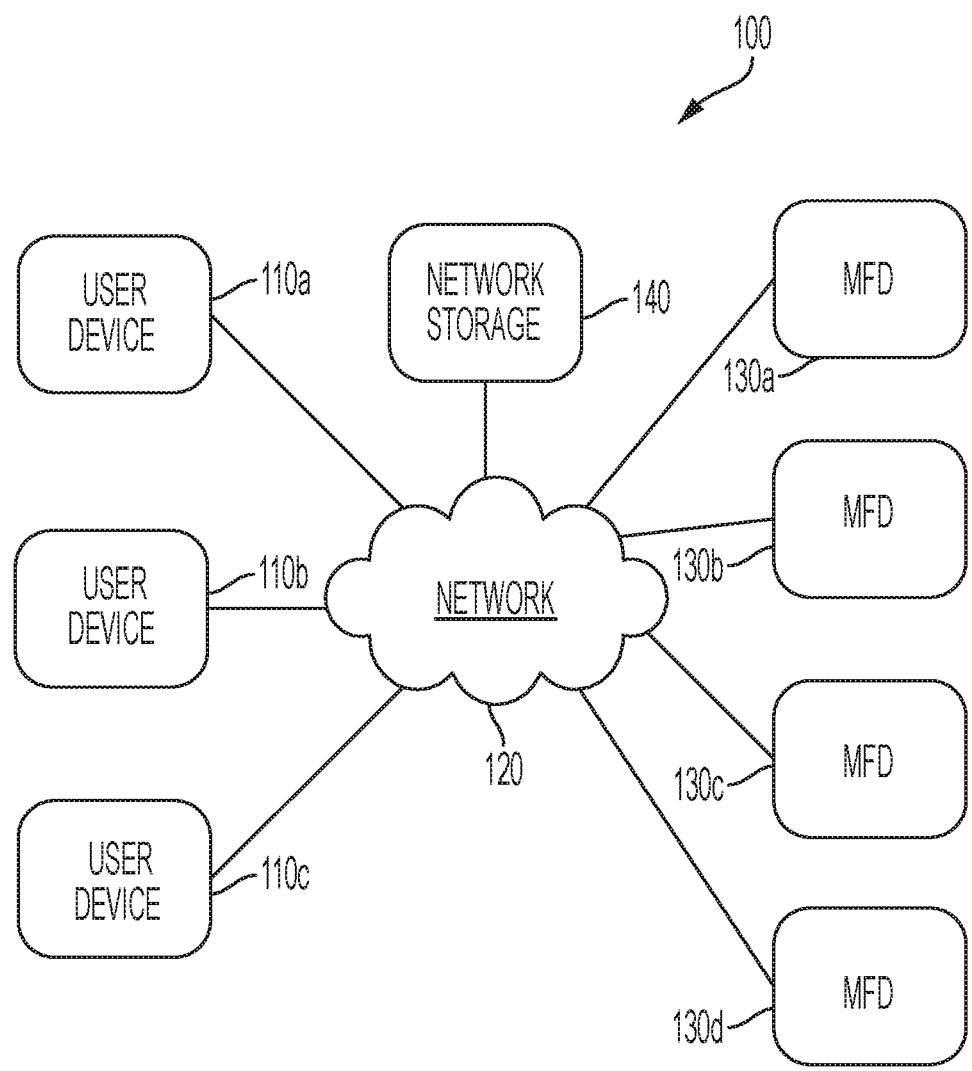
FIG. 1 depicts an exemplary system for sharing a printable electronic document between users.

It should be understood that the drawing(s) are for purposes of illustrating the concepts of the disclosure and are not necessarily the only possible configuration for illustrating the disclosure.

DETAILED DESCRIPTION

In some embodiments described herein, a system may be included to perform one or more aspects of the disclosure. The system includes a print processor that receives a command to print an electronic document associated with a job initiated on an MFD, the job initiated in response to an input from a first user. In some embodiments, the job initiated at the MFD may be one of a print job, a copy job, or a scan job. The print processor may further include one or more processors as well as other elements necessary to perform the various operations as described herein. The system further includes a user interface that received an input to share the electronic document associated with the job with a second user, the second user identified based on input from the first user. The system additionally includes a network interface that provides a notification message to the second user, the notification message indicating an availability of the electronic document associated with the job to the second user. In some embodiments, the notification message is provided to at least one of an email address of the second user or a phone number of the second user. The system may include additional electrical elements used in conjunction with general electronics and printing technology as well as specific electrical elements necessary for operation in specific types of wired and/or wireless communication networks.

In some embodiments, the print processor further determines when the second user is an authorized user on a network including the MFD. The print processor additionally creates an authorization code for the second user when the second user is not an authorized user on the network. For example, the authorization code may be a one-time password, a one-time passcode, a time-limited barcode, or a time-limited quick response code. In some embodiments, the authorization code for the second user may be included in the notification message. The authorization code may be entered by the second user to print the electronic document associated with the job on the MFD.

In some embodiments, the second user accesses the electronic document associated with the job on a second MFD that is different from the MFD on which the job was initiated. The electronic document associated with the job may be stored at a separate storage location that is connected to the second MFD.

In some embodiments described herein, a method or process is described that utilizes a mechanism for sharing a job with a second user. The method or process includes receiving a command to print an electronic document associated with a job initiated on an MFD, the job initiated in response to an input from a first user. The method or process further includes receiving an input to share the electronic document associated with the job with a second user and identifying the second user. The method or process further includes sending a notification message to the identified second user, the notification message indicating an availability of the electronic document associated with the job to the identified second user. The method or process may additionally include other aspects and mechanisms of the present disclosure as described herein.

In some embodiments described herein, an apparatus may be included to perform one or more of the aspects of the disclosure described by the various embodiments herein. The apparatus includes a memory for storing information for an electronic document associated with one of a print job, a copy job, or a scan job initiated by a primary user. The apparatus further includes a processor configured to receive an input to share the electronic document with an alternate user. The processor is further configured to identify the alternate user and provide instructions to send an electronic message to the identified alternate user, the notification message indicating an availability for access to the electronic document by the identified alternate user. The apparatus may include additional electrical elements used in conjunction with general electronics and printing technology as well as specific electrical elements necessary for operation in specific types of wired and/or wireless communication networks. The processor may further be embodied as one or more processors and may include other elements necessary to perform the various operations as described above. The memory may include additional elements including, but not limited to, a data storage element, and a memory for storing program instructions. The memory or similar elements may provide the program instructions to the processor in order to execute the various mechanisms in the embodiments described herein.

The implementation of one or more of the aspects of the processes, mechanisms, systems, and devices of the present embodiment provides the ability to enable users to share documents at a common device, the printer or MFD, without requiring transfer of the electronic document or a source file to another electronic device, such as a user device or a memory device. The implementation reduces the use and waste of resources and time associated with multiple users printing, scanning, and/or copying the same document by allowing the reuse of the same created electronic document directly at a printing device or MFD or at other networked printing devices or MFDs by multiple users. Additionally, for authorized users on the network, only the name of the user is needed to share the electronic document using the printer or MFD as the electronic document transfer mechanism. In this case, no additional information, such as the email identification or address or phone number of the user is needed for sharing the electronic document. Further, the electronic document can be shared with users who are not authorized on the network by also sharing some type of authorization mechanism between the users. Further, the implementation and authorization mechanisms may be extended to sharing the electronic document between users at any one of the printers or MFDs on the network.

These and additional operations are further described with respect to the embodiment depicted in FIGS. 1-8 below.

FIG. 1 illustrates an exemplary system 100 for releasing a secure print job between users. System 100 includes a plurality of user devices 110a-110c coupled to a plurality of MFDs 130a-130d and a network storage 140 through a network 120. User devices 110a-110c, MFDs 130a-130d, and network storage 140 may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110a-110c and/or network storage 140 may additionally be located in a different or remote facility from the dwelling or building where the one or more of the MFDs 130a-130d are located. The one or more remotely located user devices 110a-110c and/or network storage 140 may be communicatively coupled to the one or more MFDs 130a-130d through a private or public network using a communication protocol including, but not limited to, Internet Protocol or any cellular communication protocols.

In operation, system 100 performs various aspects of a mechanism for sharing a job between users. The mechanism may be performed entirely in one or more of MFDs 130-130d. In some instances, some portions of the mechanism may be performed in one or more of user devices 110a-110c or in network storage 140. The mechanism includes receiving a command to print an electronic document associated with a job initiated on one of the MFDs 130a-130d, the job initiated in response to an input from a first user. The job initiated at the one of the MFDs 130a-130d may be one of a print job, a copy job, or a scan job. The mechanism further includes receiving an input on a user interface of the one of the MFDs 130a-130d to share the electronic document associated with the job with a second user. The mechanism also includes some manner for the first user to search for and/or identify the second user on the one of the MFDs 130a-130d. The mechanism additionally includes sending a notification message from the one of the MFDs 130a 130d to the identified second user, the notification message indicating an availability of the electronic document associated with the job to the identified second user. The notification message may be provided through network 120 based on a username for the second user. The notification message may also be provided to at least one of an email address of the second user or a phone number of the identified second user.

In some embodiments, the mechanism may also include determining whether the identified second user is an authorized user on network 120 and additionally creating an authorization code for the identified second user when the identified second user is not an authorized user on the network. The authorization code may be included in the notification message when the identified second user is not authorized. The authorization code may be required to be entered by the identified second user to print the electronic document associated with the job on the one of the MFDs 130a-130d.

In some embodiments, the identified second user, after receiving the notification, may access the electronic document associated with the job on a different one of the MFDs 130a 130d instead of the one of the MFDs 130a-130d used by the first user.

In some embodiments, the electronic document associated with the job is stored at network storage 140 and may be sent to the different one of the MFDs 130a-130d to which the second user has accessed the electronic document.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Details related to devices similar to MFDs 130a-130d will be described in further detail below.

Network storage 140 may include one or more storage elements including, but not limited to, single hard drives, parallel connected or redundant array of independent disks (RAID) drives, optical drives, and solid-state drives using static or dynamic storage mechanisms. Network storage 140 may be located in one location as part of one device or may be distributed across a number of devices and/or distributed across a number of locations. In some embodiments, all or a portion of network storage 140 may operate on a network external to network 120 or in the cloud and be interfaced to user devices 110a-110c and/or MFDs 130a-130d as described above.

Figure 2:
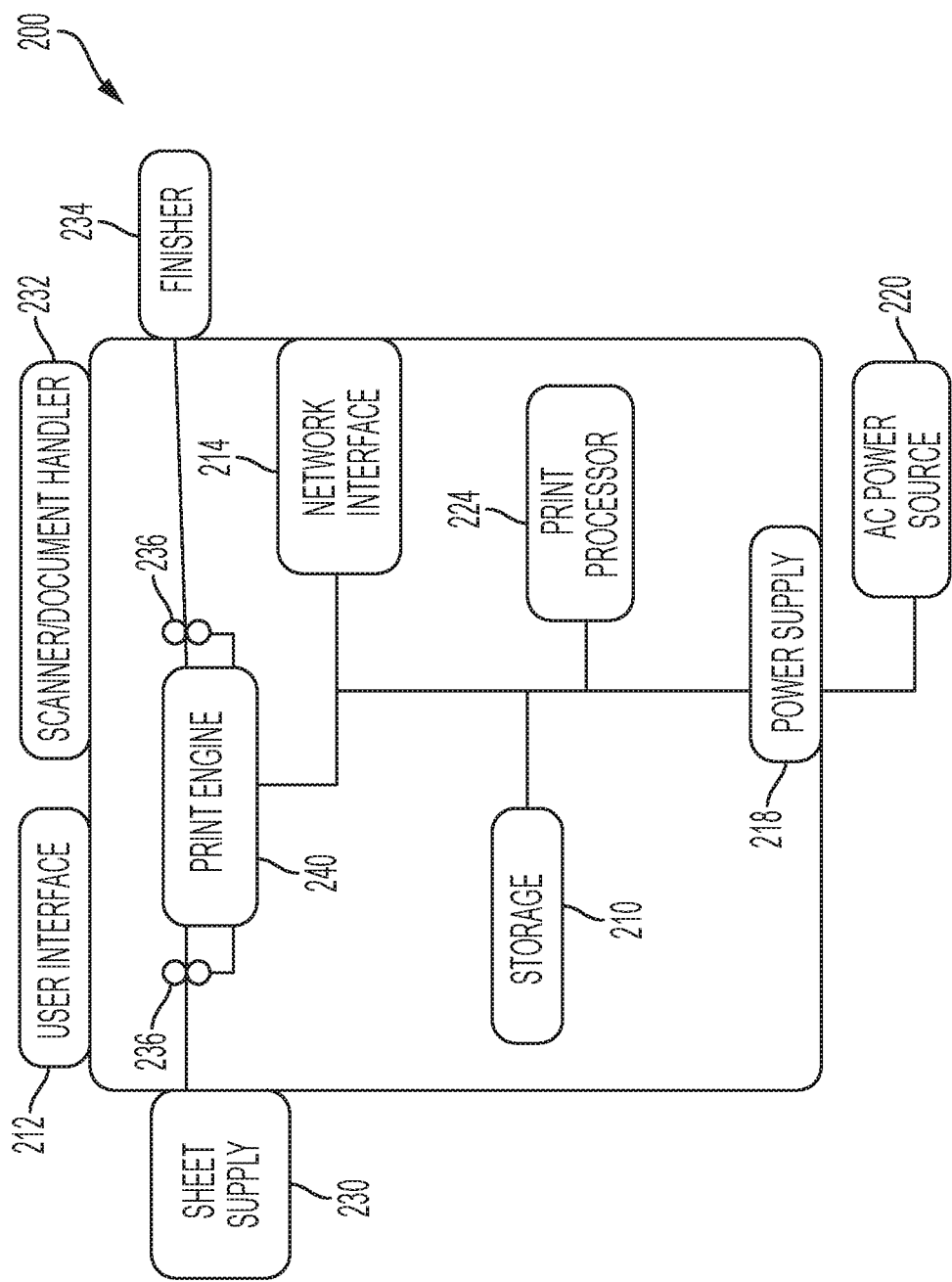
FIG. 2 depicts an exemplary printing device for sharing a printable electronic document between users.

FIG. 2 illustrates an exemplary MFD 200, which can be used for releasing a secure print job between users. MFD 200 may operate in a manner similar to MFDs 130a-130d described in FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a marking device or printing engine 240 capable of printing markings on sheets of print media, a print processor 224 operatively coupled to the printing engine 240, a user interface 212 operatively coupled (not shown) to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in MFD 200 including storage 210, network interface 214, print processor 224, and printing engine 240. Other elements may be included in MFD 200 but are not described here in the interest of conciseness.

In operation, print processor 224 receives a command to print an electronic document associated with a job initiated on receives a command to print an electronic document associated with a job initiated on an MFD, the job initiated in response to an input from a first user, the job initiated in response to an input from a first user. The job may be one of a print job, a scan job, or a copy job. It is important to note that if the job is a scan job or a copy job, the electronic document is created from a physical document (e.g., a paper document) using the scanner/document handler 232. If the job is a print job, the electronic document may be created from an electronic source file using print processor 224 or may be created using another device, such as one of the user devices 110a-110c described in FIG. 1. Information associated with the job and/or the electronic document may also be stored in and/or retrieved from storage 110.

The print processor 224 sends instructions to user interface 212 to display a message regarding sharing the electronic document used or created for the job (e.g., print job, copy job, or scan job) with another or second user and prompting for a response. The user interface 212 receives the response as an input from the first user to share the electronic document associated with the job with a second user. The response also includes some identification information for the second user. The identification information for the second user may include a username, an email address, or a mobile phone number.

After print processor receives the identification information for the second user from user interface 212, print processor 224 generates a notification message indicating the availability to the second user of the electronic document associated with the job initiated by the first user. Print processor 224 provides the notification message to network interface 214 along with instructions to send the notification message to the second user. The notification message may be provided over the network (e.g., network 120) as an email message through network interface 214 to a user device (e.g. to one of the user devices 110a-110c). The notification message may alternatively be provided or sent using a different communication network. For example, the notification message may be sent to a phone device of the user as an email or short message service (SMS) message using a cellular network.

In some embodiments, print processor 224 may further determine when the second user is an authorized user on the network including MFD 200 (e.g., network 120). Print processor 224 may create an authorization code for the second user when the second user is not an authorized user on the network and include the authorization code in the notification message. The authorization code may include but is not limited to, a one-time passcode, a one-time password, a time sensitive barcode, or a time sensitive quick response (QR) code. In order for the second user, when not authorized, to access and/or print the electronic document identified in the notification message at MFD 200 or, in some instances, another MFD on the network, the second user must enter the access code on the user interface at that MFD.

Print processor 224 may also be referred to as an image processor and operates in a different manner than a general purpose processor because it is specialized for processing image data. Further, print processor 224 along with storage 210 may also be referred to as a copy control system (CCS). A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning printable media for entry onto media path 236. Sheet supply 230 may include a bypass tray that allows external print media, such as previously printed pages to be added and entered into media path 236 for marking instead of, or in addition to, any printable media already in sheet supply 230. It is important to note that printing engine 240 along with sheet supply 230, scanner document handler 232, finisher 234 and media path 236 may collectively be referred to as an image output terminal (IOT).

As part of the printing function in MFD 200, user interface 212 displays one or more menus that may include various print options for the print jobs to be printed. In some instances, user interface 212 may be referred to as a local user interface or LUI. User interface 212 or LUI may receive instructions for displaying the menus from print processor 224 and may further provide entry information to print processor 224. The menus may include options for a user that created or requested a job (e.g., a print job, a copy job, and scan job) to share the printable electronic document created as part of the job. The menus may further include additional options for searching for information associated with a second user (e.g., username or email address) as part of sharing the printable electronic document. The menus may also include additional options accessing shared electronic documents by a second user. The menu structure for accessing shared electronic documents may include separate options for second users that are authorized on the network including MFD 200 (e.g., network 120 described in FIG. 1) as well as second users that are not authorized. Some of the various menus and screens related to sharing printable electronic documents will be described in further detail below.

MFD 200 may also be constructed and implemented as a set of modules that may be interchangeable between a plurality of printers. In some embodiments, MFD 200 may be constructed using an IOT coupled to a CCS, as described above, and further including an LUI, a power supply, and a network interface. Any one of these of the modules may be interchangeable with any like modules from other models, providing some level of flexibility and efficiency between products. As a result, one or more aspects of the present embodiments may be implemented as part of the CCS in printing device. In some embodiments, the CCS includes a memory for storing information for an electronic document associated with a job associated with the operation of MFD 200 by a primary user. The CCS further includes a processor configured to receive an input from the LUI to share the electronic document associated with the job with an alternate user. The processor may further be configured to determine and/or identify the alternate user. The processor may also be configured to provide instructions to the network interface for sending a notification message to the identified alternate user over a network (e.g., network 120 described in FIG. 1). The notification message indicates an availability for access to the electronic document by the identified alternate user.

Figure 3:
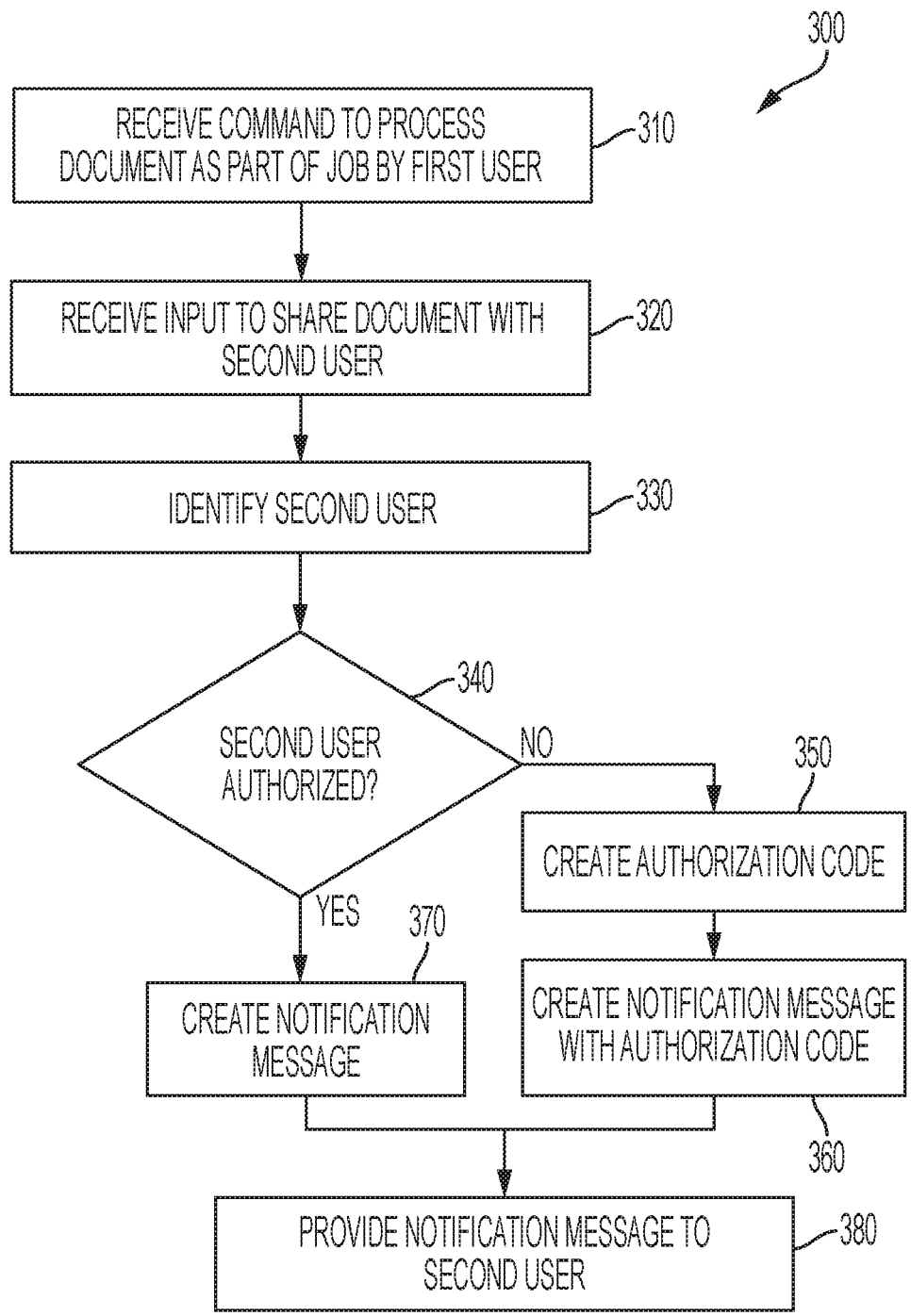
FIG. 3 depicts an exemplary process for sharing a printable electronic document between users.

FIG. 3 illustrates an exemplary process 300 for sharing a printable document between users. Process 300 is primarily described with respect to a printer/scanner/copier or MFD, such as MFD 200 described in FIG.2. Process 300 may also be performed by a printer in combination with other functions, such as MFDs 130a-130d described in FIG. 1. Further, process 300 may be performed in a combination of devices, such as user devices 110a-110c, MFDs 130a-130d, and network storage 140 described in FIG. 1. Although process 300 depicts steps performed in a particular order for purposes of illustration and discussion, the operations discussed herein are not limited to any particular order or arrangement. One skilled in the art, using the disclosures provided herein, will also appreciate that one or more of the steps of process 300 may be omitted, rearranged, combined, and/or adapted in various ways.

At step 310, a command is received to process a document as part of a job initiated by a primary or first user. The processing of the document may depend on the type of job initiated by the first user. The job may be one of a print job, a scan job, or a copy job. It is important to note that if the job is a scan job or a copy job, the electronic document is created from a physical document using the scanner/document handler 232. If the job is a print job, the electronic document may be created from a source file using print processor 224 or may be created externally. Information associated with the job and/or the electronic document may also be stored and/or retrieved from storage 110. Further, at step 310, as part of processing the document, a message may be displayed on a user interface (e.g., user interface 212) prompting the primary or first user regarding sharing the electronic document with other users. In some embodiments, the message may be displayed as part of the printing of the electronic document that has been created or associated with the job.

At step 320, an input is received at print processor 224 to share the printable electronic document created as a result of the job initiated, at step 310, with an additional or second user. The input may be as a result of a response from the first user to a message displayed on user interface 212. At step 330, the additional or second user is identified. As part of the identification, at step 330, a message may be displayed on user interface 212 with a prompt for the primary or first user to enter identification information for the additional or second user. The identification information for the additional or second user may be provided to print processor 224 and may include a username, an email address, or a mobile phone number. In some embodiments, an additional screen may be displayed on user interface 212 allowing the primary or first user to search for a second user based on one or more keywords and to select the desired additional or second user from the results of the search.

At step 340, a determination is made as to whether the additional or second user is an authorized user on the network. The determination may be performed as part of the entries made by the primary or first user, at step 330. In some embodiments, the determination may be performed in print processor 224 by analyzing information provided by the primary or first user about the additional or second user, at step 330.

If, at step 340, the second user is not an authorized user, then, at step 350, an authorization code is generated for the second user. The authorization code may be time limited in some manner and further authorized only for accessing the shared printable electronic document. The authorization code may be generated in print processor 224. For example, the authorization code may be a one-time passcode, a one-time password, a time-limited barcode, a time-limited QR code, and the like.

At step 360, a notification message is created. The notification message may be generated in print processor 224 in conjunction with the creation of the authorization code, at step 350. As such, the notification message created, at step 360, includes the authorization code created, at step 350. The notification message also includes information regarding the availability of a printable electronic document shared by the primary or first user. The notification message may also include additional information associated with the printable electronic document, such as printing instructions or other information associated with the print job initiated, at step 310.

If, at step 340, the second user is an authorized user, then, at step 370, a notification message is created for second user as an authorized user. The notification message created, at step 370, includes information regarding the availability of a printable electronic document, similar to step 360, but does not include any authorization code. However, as with the notification message created at step 360, the notification message, at step 370, may include additional printing information associated with the printable electronic document.

At step 380, the notification message created, at step 360, for an unauthorized user or the notification message created, at step 370, is provided to the additional or second user. The notification message may be passed from print processor 224 to network interface 214 along with instructions to send the notification message to the additional or second user. The notification message may be provided over the network (e.g., network 120) as an email message through network interface 214 to a user device (e.g. to one of the user devices 110*a*-110*c*). The notification message may alternatively be provided or sent using a different communication network. For example, the notification message may be sent to a phone device of the user as an email or short message service (SMS) message using a cellular network.

It is important to note that not all the steps of process 300 may be required for each additional or second user as part of sharing a printable electronic document. For example, the determination, at step 340, may not be necessary if the printable electronic document can only be shared with authorized users. Further, in some embodiments, any printable electronic document created as part of a job initiated by a primary or first user may be available to any other user that is also an authorized user.

Figure 4:
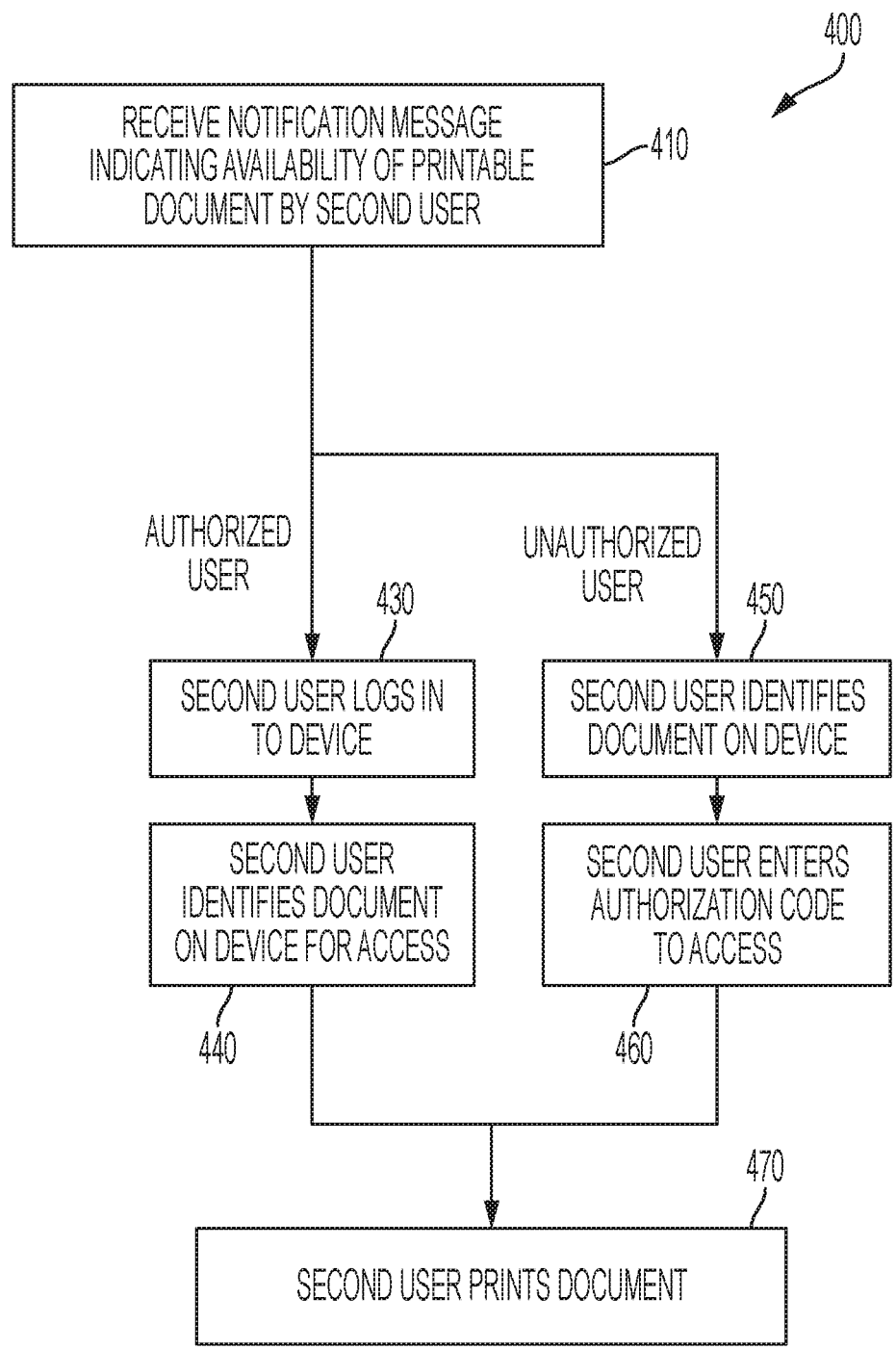
FIG. 4 depicts another exemplary process for sharing a printable electronic document between users.

FIG. 4 illustrates another exemplary process 400 for sharing a printable electronic document between users. Process 400 is primarily directed to operations associated with accessing and printing the shared printable electronic document by the second user after receiving the notification message that was provided as described at step 380 in FIG. 3. Process 400 is primarily described with respect to a printer/copier/scanner or MFD, such as MFD 200 described in FIG. 2. Process 400 may also be performed by a printer in combination with other functions, such as MFDs 130*a*-130*d* described in FIG. 1. Further, process 400 may be performed in a combination of devices, such as user devices 110*a*-110*c*, MFDs 130*a*-130*d*, and network storage 140 described in FIG. 1. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, the notification message provided at step 380 in FIG. 3 and indicating the availability of a printable electronic document is received by the additional or second user. The notification message may be received on a user device (e.g., one of the user devices 110*a*-110*c* described in FIG. 1) operated by the additional or second user through a local network (e.g., network 120 described in FIG. 1). The notification message may alternately be received on a mobile device operated by the additional or second user through an external or wide area network.

As described in process 300 above, one of two different types of notification messages are sent to the additional or second user depending on the status or authorization condition for the additional or second user. At step 430, an additional or second user who is authorized for access to the network (e.g., network 120 described in FIG. 1), referred to as an authorized user, accesses or logs in to a printer/MFD on the network. In some embodiments, the printer/MFD is the same as the MFD used by the first or primary user to initiate the job (e.g., print job, copy job, or scan job). In some embodiments, the printer/MFD may be different form the MFD used by the first or primary user to initiate the job or any printing device that is connected to the network. In order to accommodate access and printing on any printer, the electronic document associated with the job may be stored on the MFD used by the first or primary user to initiate the job and accessed by another printer through the network (e.g., network 120 described in FIG. 1). Alternatively, the electronic document may be stored at a storage location (e.g., network storage 140) that is connected to any or all of the printing devices or MFDs on the network.

At step 440, the additional or second user, after logging in at step 430, identifies as well as accesses or retrieves the printable electronic document from the printing device or MFD that the additional or second user has directly logged into. The additional or second user may also access or retrieve, through the printing device or MFD, at step 440, the printable electronic document from another MFD or printing device or from a storage location over the network.

At step 450, an additional or second user who is not authorized for access to the network (e.g., network 120 described in FIG. 1), referred to as an unauthorized user, searches for and identifies the shared printable electronic document at a printing device or MFD. In some embodiments, the printing device or MFD is the same as the MFD used by the first or primary user to initiate the job (e.g., print job, copy job, or scan job). In some embodiments, the printer/MFD may be different form the MFD used by the first or primary user to initiate the job or any printing device that is connected to the network. In order to accommodate access and printing on any printer, the electronic document associated with the job may be stored on the MFD used by the first or primary user to initiate the job and accessed by another printer through the network. Alternatively, the electronic document may be stored at a storage location (e.g., network storage 140) that is connected to any or all of the printing devices or MFDs on the network.

At step 460, after the additional or second user identifies the available printable electronic document, the additional or second user enters the authorization code included in the received notification message, at step 450, to access and/or retrieve the printable electronic document. The authorization code may be time limited in some manner and further authorized only for access the shared printable electronic document as described above. The authorization code may be entered on user interface 212 and confirmed or verified using print processor 224.

At step 470, the retrieved printable electronic document accessed, at step 440 by an authorized second user or at step 460 by an unauthorized user, is printed on the printing device or MFD. As described above, the printable electronic document may also include print instruction embedded in the document or may also have an additional file including information associated with printing the document. Alternatively, the additional or second user, as an authorized user or as an unauthorized user, may create a print job as part of printing the printable electronic document, at step 470. In some embodiments, the printing, at step 470, may additionally or alternatively include saving or storing the printable electronic document to a local portable memory device, such as a universal serial bus (USB) flash drive or the like.

It is important to note that not all the steps of process 400 may be required for each additional or second user as part of sharing a printable electronic document. For example, the identification of the printable electronic document by an unauthorized user, at step 450, may not be necessary or may be included directly as part of entering the authorization code, at step 460. Further, in some embodiments, steps 450 and 460 for unauthorized users may not be necessary if the printable electronic document can only be shared with and accessed by authorized users.

Figure 5:
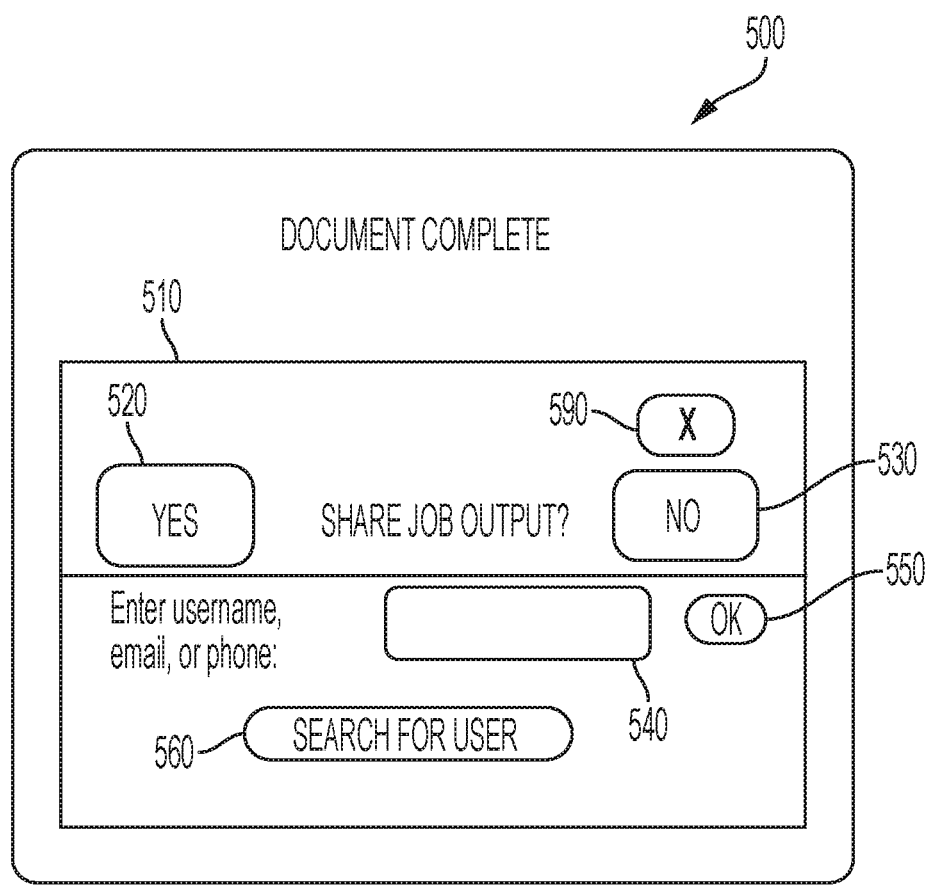
FIG. 5 depicts an exemplary screenshot from a display on a device used as part of sharing a printable electronic document between users.

FIG. 5 depicts an exemplary job output sharing screen 500, as part of completing a job, such as print job, copy job, or scan job, on a display. Sharing screen 500 includes a job document sharing window 510 that may appear on a display at or near the completion of the job on the MFD (e.g., MFD 200 described in FIG. 2). The job document sharing window 510 includes a job output selection section with a yes button 520 and a no button 530. If the no button is selected, a new screen is shown as part of continuing to process the current job on the MFD or as part of job completion.

If the yes button 520 is selected in job document sharing window 510, the lower section of job document sharing window 510 activates to allow entry and selection of information for a second user as part of initiating the sharing of the printable electronic document from the job. For some users, such as users that do not have an account on the network or are authorized to use the MFD, an entry box 540 is provided with a prompt to enter a username, email address or phone number for the second user. An ok button 550 is provided for selection after entering the identification information for the second user in entry box 540 and to initiate the creation and providing of a notification message, along with an authorization code if needed, as described in steps 350, 360, and 370 in FIG. 3.

Job document selection window 510 also includes search for user button 560. Selecting the search for user button 560 displays a new screen that includes a window for enabling the first user to search for and select another user. A cancel button 590, labelled with an X, is also included to allow for exit of this selection screen and/or return to a previous menu screen on the display.

Figure 6:
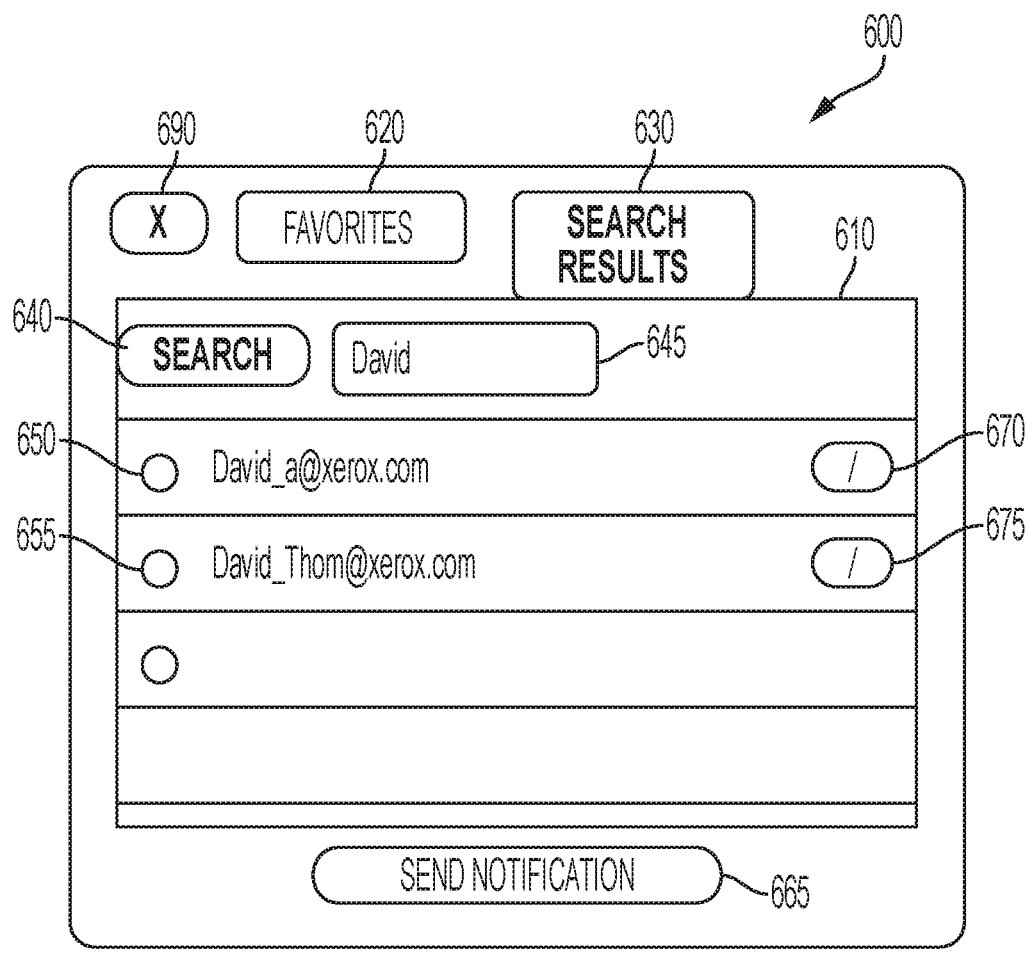
FIG. 6 depicts another exemplary screenshot from a display on a device used as part of sharing a printable electronic document between users.

FIG. 6 depicts an exemplary user search selection screen 600, as part of completing a job, such as print job, copy job, or scan job, on a display. User search selection screen 600 may appear as a result of selecting the search feature in a different screen, such as the search for user button 560 in job output sharing screen 500 described in FIG. 5. User search selection screen 600 includes two selection mechanism tabs, a favorites tab 620 and a search results tab 630. As shown in user search selection screen 600, the search results tab 630 is selected and displays a search results window 610 associated with the search result tab 630. Search results window 610 includes a search text entry box 645 and a search button 640, to enter information for search and initiate the search. The search mechanism provides search results for entry identifying information for other users on the network, such as users authorized to use the printers and MFDs on the network (e.g., network 120 described in FIG. 1). In a similar manner, the favorites tab 620, when selected, may display a list of users identified as favorites for the user that initiated the job on the MFD (e.g., the first user). It is important to note that more or fewer selection mechanism tabs may be included in print job selection screen 600, including additional user and/or search selection mechanisms known to those skilled in the art.

The search results from a search initiated by selecting the search button 640 are displayed in rows. Each row includes a radial selection button 650, 655 as well as information identifying the users found as a result of the search. In search results window 600, an email address for each user is shown but in other embodiments, other information for each user may be shown. Each row further includes an I selection button 670, 675. Selecting I selection button 670, 675 opens an additional window (not shown) that provides additional information about the user identified from the search results, if available. After the first user selects one or more of the radial selection buttons 650, 655, the user completes the entry by selecting the send notification button 665. In some embodiments, only authorized users are identified using the search mechanism as part search results tab 630. A cancel (X) button 690 is also included to allow for exit from the print job selection screen 600 and/or return to a previous menu screen on the display. In some embodiments, selecting the cancel (X) button 690 brings up the job output sharing screen 500 on the display.

Figure 7:
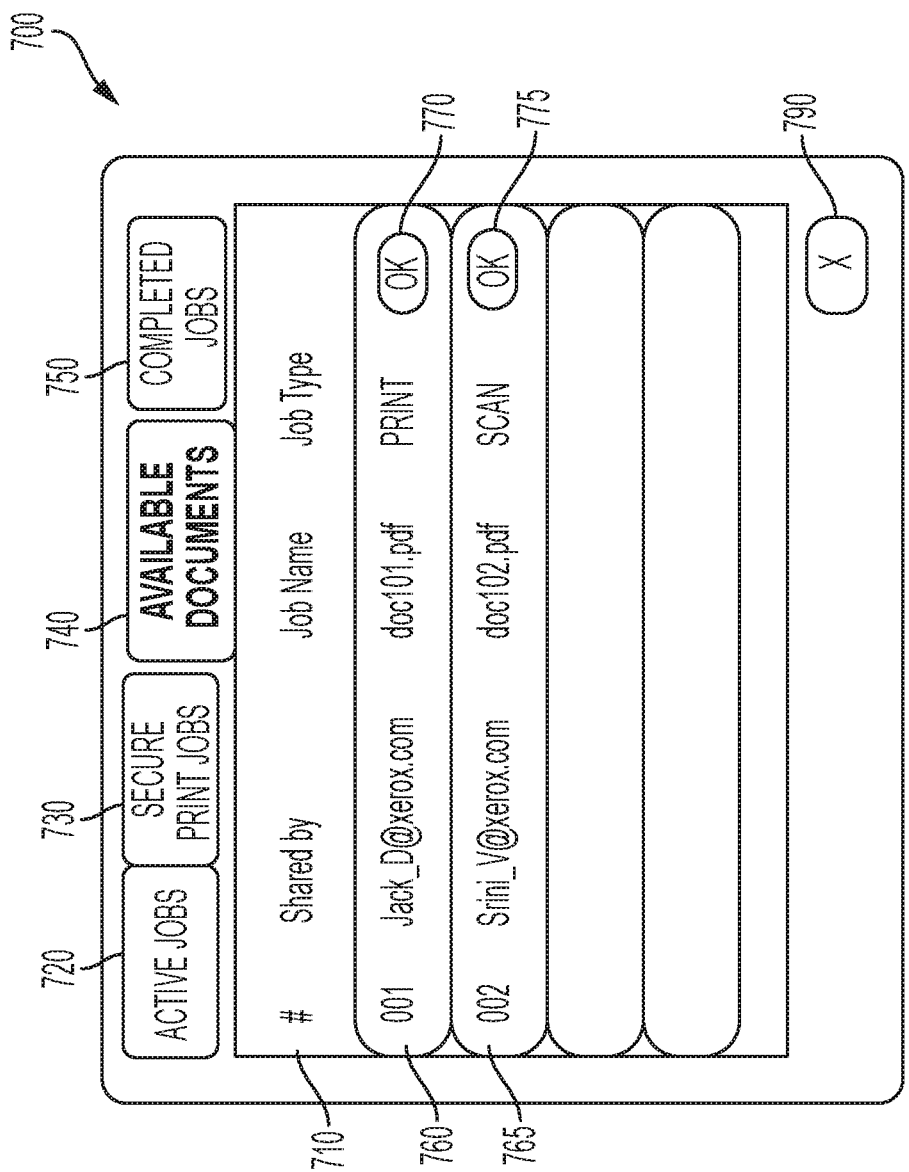
FIG. 7 depicts a further exemplary screenshot from a display on a device used as part of sharing a printable electronic document between users.

FIG. 7 depicts an exemplary document print selection screen 700, as part of accessing and/or printing an electronic document that has been shared between users, on a display. Document print selection screen 700 is displayed to a second user that is authorized to be on the network and has logged on to the network through a specific printing device, such as MFD 200. Document print selection screen 700 includes four selection mechanism tabs, an active jobs tab 720, a secure print jobs tab 730, an available documents tab 740, and a completed jobs tab 750. As shown in print job selection screen 700, the available documents tab 740 is selected and displays a search results window 710 associated with the available documents tab 740. It is important to note that more or fewer selection mechanism tabs may be included in print job selection screen 700, including additional selection mechanisms known to those skilled in the art.

Search results window 710 under the available documents tab 740 includes a set of rows 760, 765 associated with shared printable electronic documents available to the user. Each of the rows 760, 765 includes an entry number, the username of the user that shared the document, a document name that may be assigned by the printer or by the user sharing the document, and a job type for the initial creation of the document (e.g., print, copy, scan). In other embodiments, different, more, less information for the available shared printable electronic documents may be included in rows 760, 765. Each of the rows 760, 765 also include a selectable OK button 770, 775. Once the second user selects one of the OK buttons 770, 775, a new screen may be displayed containing, for instance, a print menu included as part of normal operation of a printer of MFD (e.g., MFD 200 described in FIG. 2). Document print selection window 700 also includes a cancel (X) button 790 for exiting from the document print selection window 700 and/or returning to a previous menu screen on the display. In some embodiments, selecting the cancel (X) button 790 exits to a main or opening screen for the printing device or MFD.

Figure 8:
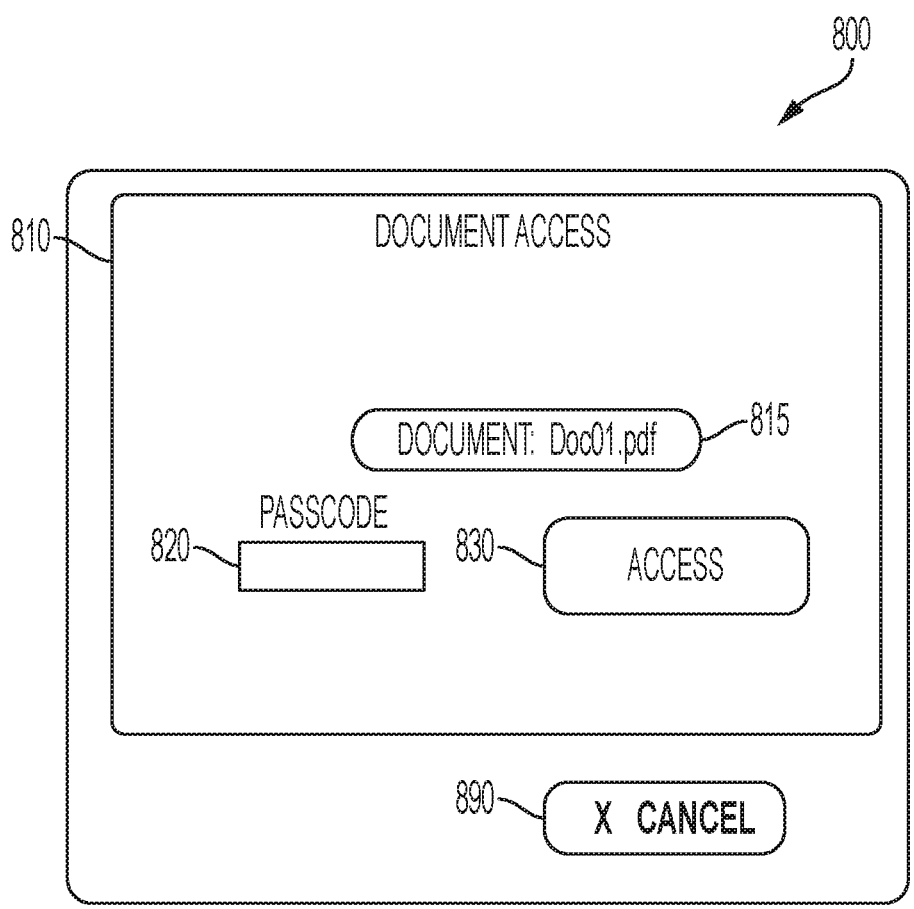
FIG. 8 depicts yet another exemplary screenshot from a display on a device used as part of sharing a printable electronic document between users.

FIG. 8 depicts another document print selection screen 800, as part of accessing and/or printing an electronic document that has been shared between users, on a display. Document print selection screen 800 is displayed to a second user that is not authorized to be on the network and will need to enter an authorization code at a printer or MFD, such as MFD 200, to access the printable electronic document. Document print selection screen 800 may be displayed to the second user after making a selection associated with an unauthorized user that is included as a selection element of the normal login screen on the printing device (e.g., MFD 200 described in FIG. 2).

Document print selection screen 800 includes a document access window 810. Document access window 810 includes a text box 815 listing the available document. Document access window 810 also includes a passcode entry box 820 for entering the passcode provided to the second user as part of the notification message and an access button 830. The second user requesting access enters the authorization information, such as the passcode, in entry box 820 and selects the access button 830 in a manner consistent with steps 450 and 460 described in FIG. 4. After the second user enters the passcode in box 820 and selects the access button 830, a new screen is displayed containing, for instance, a print menu as part of normal operation of a printer or MFD (e.g., MFD 200 described in FIG. 2). A cancel (X) button 890 is also included to allow for exiting from the document print selection screen 800 and/or for returning to a previous menu screen on the display. In some embodiments, selecting the cancel button 890 exits to a main or opening screen for the printing device or MFD.

The terms printer, MFD, or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example process (es). The computer-readable storage medium is a computer-readable memory device. The computer-readable storage medium can, for example, be implemented via one or more of a volatile computer memory, a nonvolatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for sharing a printable electronic document between users (which are intended to be illustrative and not limiting), it is noted that modifications and variations can be made by persons skilled in the art in light of the above teachings. It is, therefore, to be understood that changes may be made in the particular embodiments of the disclosure disclosed which are within the scope of the disclosure as outlined by the appended claims.

What is claimed is:

1. A system, comprising:
a multi-function device including:
a print processor that receives a command to print an electronic document associated with a job initiated on the multi-function device, the job initiated in response to an input from a first user;
a user interface that receives instructions from the print processor after the print processor receives the command from the first user to display a menu to the first user in order to complete the job, the menu allowing sharing of the electronic document with a second user, the menu including a job sharing window having a job output selection section permitting selection of a sharing option for sharing of the electronic document with the second user, wherein upon receiving a selection of the sharing option through the job sharing window, the user interface receives an input from the first user through a section of the job sharing window of the menu including both an entry box allowing entry of user identification for an individual corresponding to the second user and a search for user function allowing retrieval of stored user information for the individual user corresponding to the second user to share the electronic document associated with the job with the second user, the second user identified based on the input from the first user;
a network interface that receives instructions from the print processor to provide a notification message over a network to a user device operated by the second user, the notification message indicating an availability of the electronic document associated with the job to the second user, wherein the instructions from the print processor provide for a first notification message for an authorized user and a second notification message for an unauthorized user.

2. The system of claim 1, wherein the print processor further determines, based on the input from the first user, when the second user is an authorized user on the network including the multi-function device and creates an authorization code for the second user when the second user is not an authorized user on the network.

3. The system of claim 2, wherein the authorization code for the second user is included in the notification message.

4. The system of claim 3, wherein the authorization code is one of a one-time password, a one-time passcode, a time-limited barcode, and a time-limited quick response code.

5. The system of claim 3, wherein the print processor provides a document print selection screen including a code entry box, and the authorization code is entered by the second user to print the electronic document associated with the job on the multi-function device.

6. The system of claim 1, wherein the notification message is provided to at least one of an email address of the second user or a phone number of the second user.

7. The system of claim 1, wherein the job initiated at the multi-function device is one of a print job, a copy job, or a scan job.

8. The system of claim 1, wherein the second user accesses the electronic document associated with the job on a second multi-function device that is different from the multi-function device on which the job was initiated.

9. The system of claim 8, wherein the electronic document associated with the job is stored at a storage location that is connected to the second multi-function device.

10. A method, comprising:
receiving a command at a print processor of a multi-function device to print an electronic document associated with a job initiated on the multi-function device, the job initiated in response to an input from a first user;
receiving, at a user interface, instructions from the print processor after the print processor receives the command from the first user to display a menu to the first user in order to complete the job, the menu allowing sharing of the electronic document with a second user;
displaying, at the user interface, the menu allowing sharing of the electronic document with the second user, the menu including a job sharing window having a job output selection section permitting selection of a sharing option for sharing of the electronic document with the second user;
receiving an input at the user interface through a section of the job sharing window of the menu including both an entry box allowing entry of user identification for an individual corresponding to the second user and a search for user function allowing retrieval of stored user information for the individual corresponding to the second user to share the electronic document associated with the job with the second user;
identifying the second user at the print processor based on input by the first user through the user interface;
receiving, at a network interface, instructions from the print processor to send a notification message to the identified second user; and
sending a notification message from the network interface to the identified second user over a network, the notification message indicating an availability of the electronic document associated with the job to the identified second user, wherein the instructions from the print processor provide for a first notification message for an authorized user and a second notification message for an unauthorized user.

11. The method of claim 10, further comprising:
Determining, based on the input from the first user, whether the identified second user is an authorized user on the network including the multi-function device; and
creating an authorization code for the identified second user when the identified second user is not an authorized user on the network.

12. The method of claim 11, wherein the authorization code for the identified second user is included in the notification message.

13. The method of claim 12, wherein the print processor provides a document print selection screen including a code entry box, and the authorization code is entered by the identified second user to print the electronic document associated with the job on the multi-function device.

14. The method of claim 10, wherein the notification message is provided to at least one of an email address of the second user or a phone number of the identified second user.

15. The method of claim 10, wherein the job initiated at the multi-function device is one of a print job, a copy job, or a scan job.

16. The method of claim 10, wherein the identified second user accesses the electronic document associated with the job on another multi-function device that is not the same as the multi-function device on which the job was initiated.

17. The method of claim 16, wherein the electronic document associated with the job is stored at a storage location that is connected to the multi-function device on which the identified second user accesses the electronic document.

18. A multi-function device comprising:
a memory for storing information associated with an electronic document created as part of one of a print job, a copy job, or scan job initiated by a primary user; and
a processor configured to:
receive a command to print an electronic document associated with a job;
send instructions, upon receiving the command, to a user interface to display a menu to the primary user in order to complete the job, the menu allowing sharing of the electronic document with an alternate user, the menu including a job sharing window having a job output selection section permitting selection of a sharing option for sharing of the electronic document with the alternate user;
receive an input from the primary user through a section of the job sharing window of the menu including both an entry box allowing entry of user identification for an individual corresponding to the alternate user and a search for user function allowing retrieval of stored user information for the individual user corresponding to the alternate user;
identify the alternate user based on input by the primary user through the user interface; and
provide instructions to a network interface to send an electronic message to the identified alternate user, the electronic message indicating an availability for access to the electronic document by the identified alternate user, wherein the instructions from the print processor provide for a first notification message for an authorized user and a second notification message for an unauthorized user.

19. The multi-function device of claim 18, wherein the processor is further configured to:
determine when the identified alternate user is not authorized to access electronic documents on the multi-function device; and
create an authorization code for the identified alternate user when the identified alternate user is not authorized to access electronic documents on the multi-function device.

20. The multi-function device of claim 19, wherein the authorization code for the identified alternate user is included in the electronic message.

* * * * *